Figure 1:
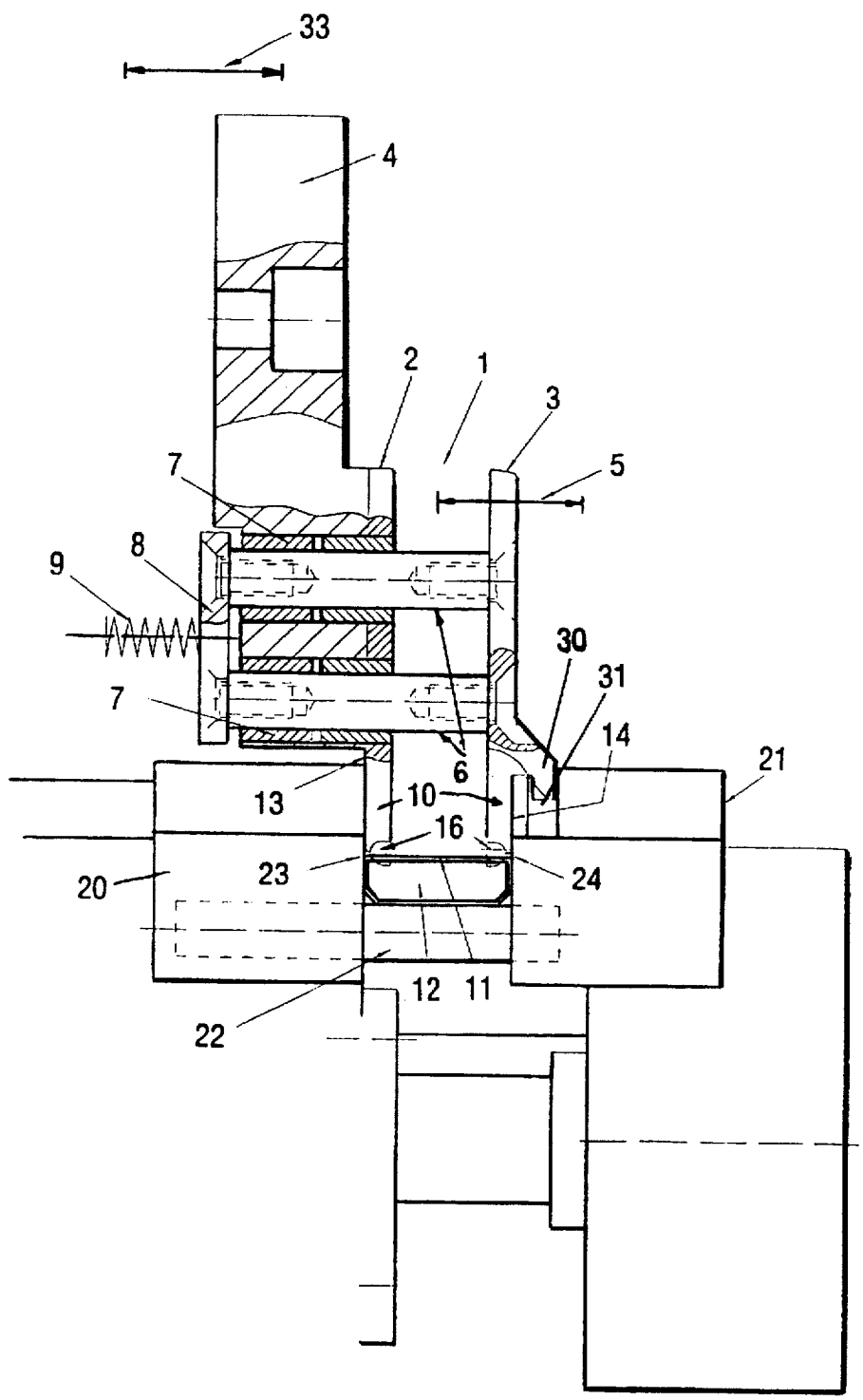

United States Patent [19]

Lisec

[11] Patent Number: 5,794,481
[45] Date of Patent: Aug. 18, 1998

[54] DEVICE FOR BENDING OR CURVING HOLLOW-SECTION STRIPS

[76] Inventor: Peter Lisec, Bahnhofstrasse 34, A-3363 Amstetten-Hausmening, Austria

[21] Appl. No.: 740,391

[22] Filed: Oct. 29, 1996

[30] Foreign Application Priority Data

Oct. 31, 1995 [AT] Austria ........................... 1799/95

[51] Int. Cl.[6] ............................................... B21D 7/022
[52] U.S. Cl. ............................. 72/307; 72/316; 72/322
[58] Field of Search ........................... 72/307, 306, 316, 72/322, 172–175

[56] References Cited

U.S. PATENT DOCUMENTS

| 266,538 | 10/1882 | Seaman | 72/174 |
|---|---|---|---|
| 308,619 | 1/1884 | Arthur | 72/174 |
| 2,365,882 | 12/1944 | Kane | 72/173 |
| 5,117,669 | 6/1992 | Lisec | 72/319 |
| 5,161,401 | 11/1992 | Lisec | 72/307 |
| 5,243,844 | 9/1993 | Lisec | 72/307 |

FOREIGN PATENT DOCUMENTS

| 0 483 044 | 4/1992 | European Pat. Off. . |  |
|---|---|---|---|
| 0 582 064 | 2/1994 | European Pat. Off. . |  |
| 31 18969 | 12/1982 | Germany . |  |
| 551447 | 2/1943 | United Kingdom | 72/173 |
| 637809 | 5/1950 | United Kingdom | 72/172 |

Primary Examiner—Daniel C. Crane
Attorney, Agent, or Firm—Young & Thompson

[57] ABSTRACT

A device for bending hollow-section strips (12) with clamping and guiding jaws (20, 21). A bending support (1) is provided, which consists of two bending support parts (2, 3) that engage between clamping and guiding jaws (20, 21). Bending support parts (2, 3) are independent of the clamping and guiding jaws (20, 21), which can be adjusted in the bending plane relative to the clamping and guiding jaws (20, 21). One bending support part (2) is mounted on a support (4) and the other bending support part (3) can be shifted, relative to the bending support part (2) that is mounted on the support (4), in a direction (arrow 5) that is perpendicular to the bending plane, whereby a movable bending support part (3) is under the action of a spring (9), which urges it away from the bending support part that is mounted on the support (4). Thus, the bending support (1) is automatically adjusted to an effective width that corresponds to the width of the hollow-section strip (12). For intermediate transport of the hollow-section strip (12), the clamping and guiding jaws (20, 21) need not be moved away from the side walls of the hollow-section strip (12).

20 Claims, 5 Drawing Sheets

DEVICE FOR BENDING OR CURVING HOLLOW-SECTION STRIPS

The invention relates to a device for bending or curving hollow-section strips.

Devices for bending hollow-section strips are known. For example, reference can be made to DE-41 16 268 A and DE 41 16 521 A, from which devices for bending hollow-section strips into spacer frames for insulating glass panes are known. With the known devices, sharp-edged layouts, in which the legs of the hollow-section strip that lead to the corner project at a right angle or at any other (obtuse or acute) angles to one another, are produced. With the known bending devices, it is also possible to produce curvatures with largely any curvature radii in hollow-section strips.

A bending machine for bending hollow-section strips into spacer frames for insulating glass panes is also known from EP 483 044 B.

In contrast to the bending devices as they are known from DE DE 41 16 268 A or DE 41 16 521 A, in which the bending support essentially extends over the width of the hollow-section strip, two rivetlike pins that are made with head and handle are provided as the bending support in EP 483 044 B.

Disadvantageous in the design according to EP 483 044 B is that the pins that are used as bending supports are fastened to jaws that laterally adjoin the hollow-section strip that is to be bent, so that they can be moved only with the guide jaws. This means that, i.a., relative movements between the pins that are used as bending supports and the jaws are not possible, so that in the case of intermediate transport, the bending pins cannot be raised from the hollow-section strip by themselves, but rather the jaws must also be adjusted relative to the hollow-section strip.

Starting from the bending machine that is known from EP 483 044 B, the object of the invention is to indicate an improved device for bending hollow-section strips, with which both sharp-edged corners and curved sections can be produced in hollow-section strips, as they are used, for example, for the manufacturing of spacer frames for insulating glass panes.

In the invention, the divided bending support can be raised from the hollow-section strip for intermediate transport of the hollow-section strip, without the clamping and guiding jaws having to be moved. In this connection, it should be pointed out that the bending support according to the invention can be advanced toward the hollow-section strip so far that the wall of the hollow-section strip that faces the bending block and lies inward after the bending is deformed on the wall of the hollow-section strip that later forms the outside corner.

Figure 2:
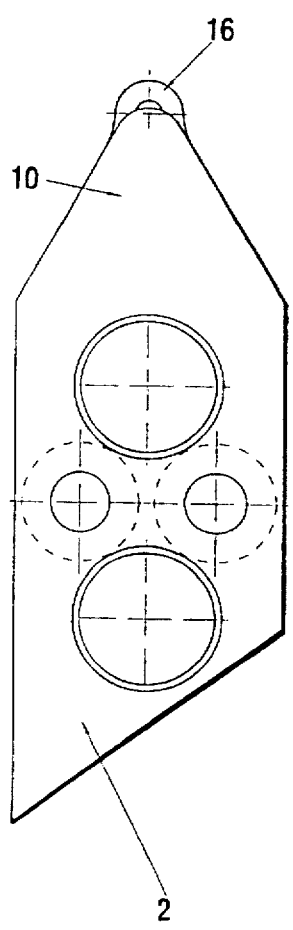
Figure 3:
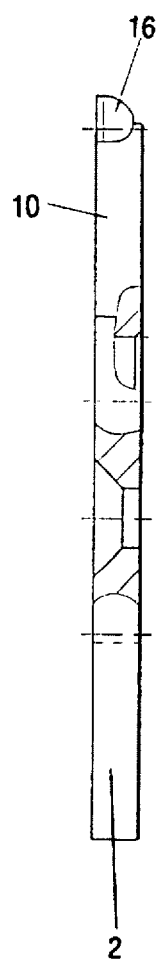
Figure 4:
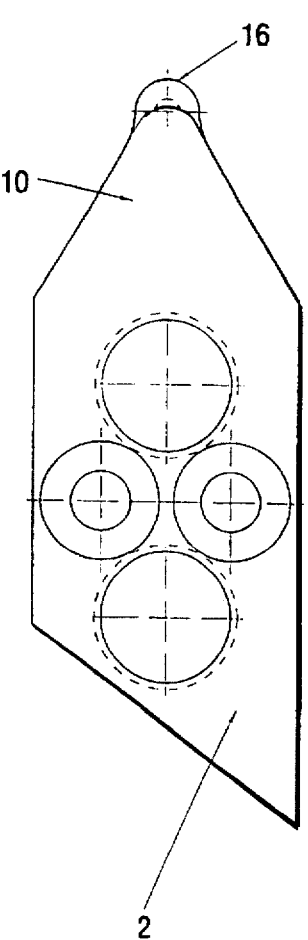
Figure 5:
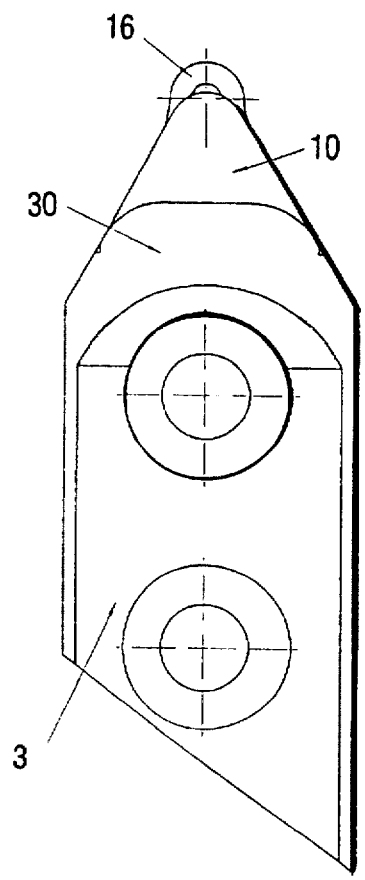
Figure 6:
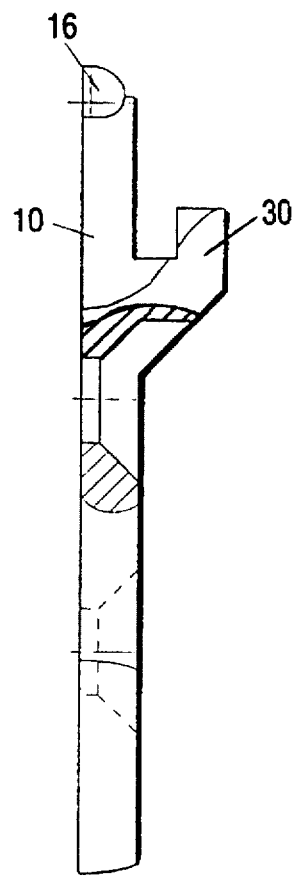
Figure 7:
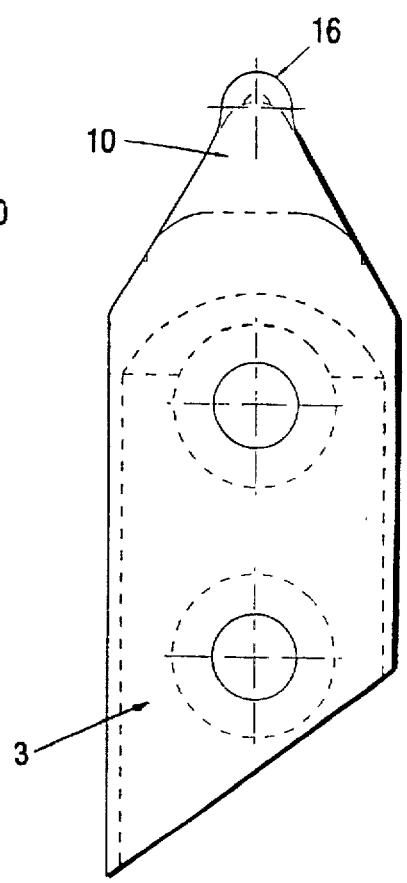
Figure 7:
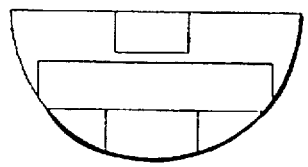
Figure 8:
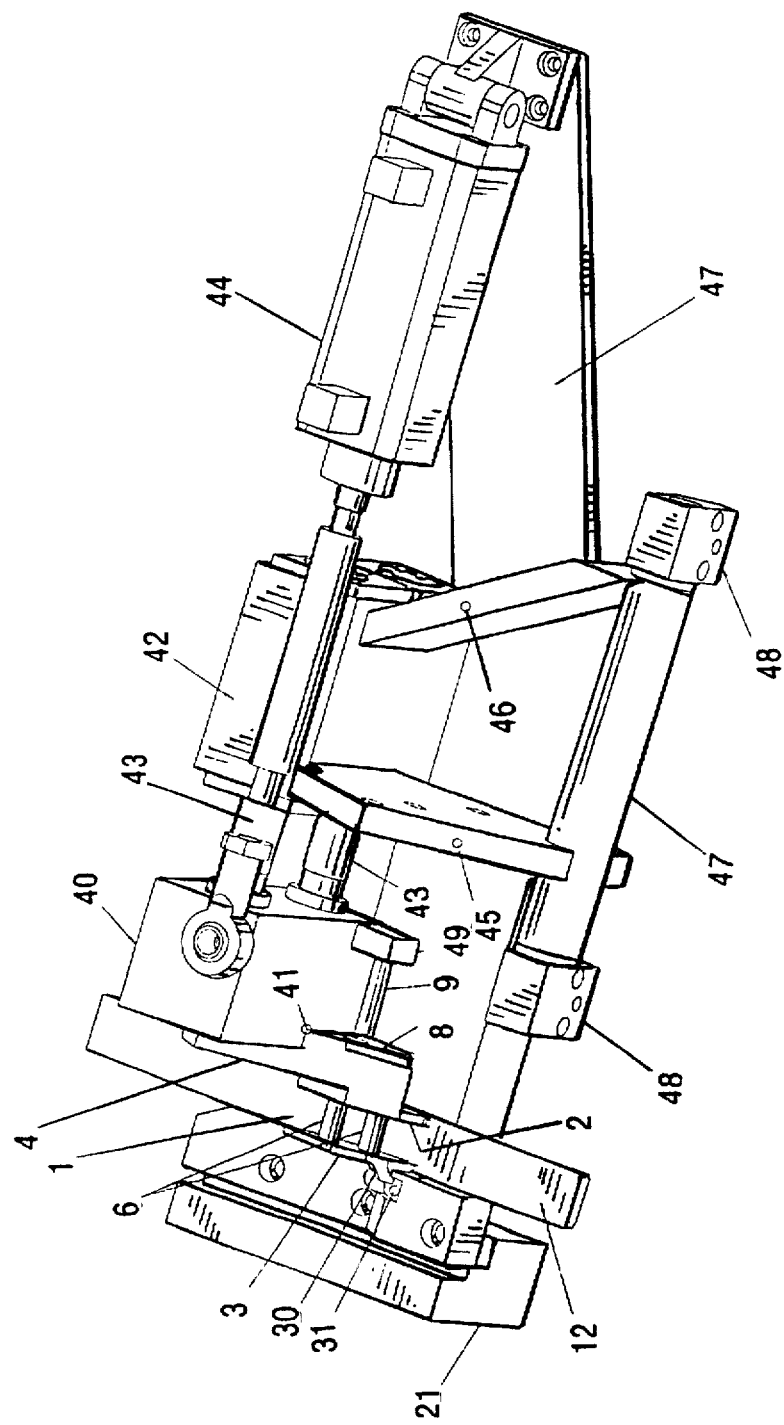
Figure 9:
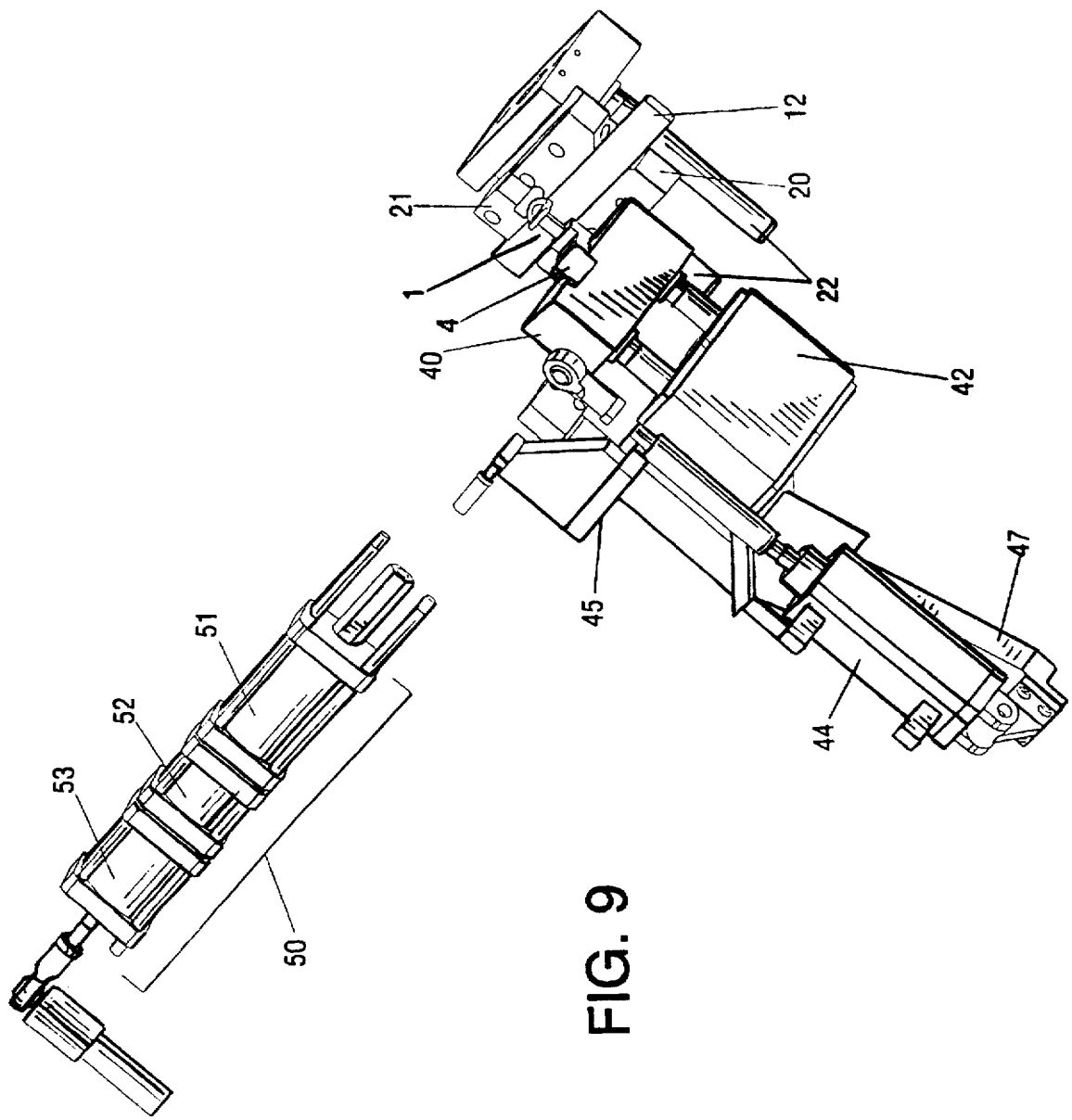

Other features and details as well as advantages of the device according to the invention follow from the description below of a preferable embodiment of the invention, in which reference is made to the attached drawings. Here:

FIG. 1 shows in section a bending support and two clamping and guiding jaws of a device for bending hollow-section strips, FIGS. 2 to 4 show the one bending support part in various views, FIGS. 5 to 7 show the other bending support part in various views, FIG. 8 shows the holder of the bending support in oblique view, and FIG. 9 shows the holder of FIG. 8 in another view with a drive for moving the bending support.

Before going into detail in the description of the drawing figures, it can be pointed out that the bending support and the clamping and guiding jaws that are shown in the drawings can be incorporated in a device that can be designed the same way as known from DE 41 16 268 A or DE 41 16 251 A. Such a bending device usually has a device for feeding hollow-section strips, a lateral supporting wall, which the bent sections of the hollow-section strip adjoin, a bending lever that can pivot greatly to bend the hollow-section strip around the bending support, as well as conveying devices (e.g., feed grippers that grasp the hollow-section strips) for the transport of hollow-section strips between the individual bending steps.

It should further be pointed out that with the bending support according to the invention, according to a mode of operation that is known from DE 41 16 521 A, curved sections can also be produced in hollow-section strips, by advancing the hollow-section strip, under the bending block that is lowered into its operative position, from the oblique bending lever that is thus somewhat raised from the conveying device and preferably at a standstill, so that a curved section of the hollow-section strip is produced.

Bending support 1 specifically consists of two bending support parts 2, 3 that are carried on a common support 4, which, for its part, is mounted on a holder 40 (FIG. 8). One bending support part 2 (FIGS. 2 to 4) is rigidly fastened to support 4. Second bending support part 3 (FIGS. 5 to 7) can be shifted in the direction of double arrow 5 in FIG. 1. For this purpose, second bending support part 3 is connected with guide pins 6, e.g., screwed to the latter. Guide pins 6 penetrate holes in bending support part 2 and are received, sliding, in guide bushes 7 in support 4 of bending support 1. On a plate 8 that is connected with guide pins 6 of movable bending support part 3, a pressure spring 9 engages, which is supported with its other end (FIG. 8) on a component 49 that is connected with support 4 or holder 40 for bending support 1, so that movable bending support part 3 is spring-loaded to move away from bending support part 2 that is integral with the support.

Instead of coil spring 9, another spring agent, such as a compressed-air spring or the like, can also be provided.

In its readiness position, bending support 1 is oriented so that free ends 10 of bending support parts 2, 3 are located just in front of upper wall (11) (after the inside wall bends) of hollow-section strip 12. Both in readiness position and in operative position shown in FIG. 1, bending support 1 is taken with its front ends 10 between clamping and guiding jaws 20, 21.

Clamping and guiding jaws 20, 21 are designed, for example, as known from DE 41 16 268 A. For the purpose of matching the width of hollow-section strip 12 that is to be bent, one jaw 20 is mounted in a stationary manner in the machine frame, conversely other jaw 21 is movably guided with the aid of a pressure medium cylinder to guide rods 22, which can be used simultaneously as a brace, from below, of hollow-section strip 12.

In this case, the configuration, as FIG. 1 shows, is made so that bending support part 2 that is securely mounted on support 4 is assigned to stationary jaw 20 and movable bending support part 3 is assigned to movable jaw 21. Outside surfaces 13, 14 of bending support parts 2, 3 are assigned to inside surfaces 23, 24, i.e., surfaces 23, 24 of clamping and guiding jaws 20, 21 that face hollow-section strip 12 that is to be bent, and adjoin, at bending support 1 that dips into the space between clamping and guiding jaws 20, 21, these surfaces 23, 24.

Free ends 10 of bending support parts 2, 3, which are designed with an acute taper as shown in FIGS. 2 to 7, can be provided with a beadlike projection 16. This projection 16 is offset inward relative to outside surfaces 13, 14 of bending support parts 2, 3, i.e., the surfaces that adjoin surfaces 23, 24 of clamping and guiding jaws 20, 21 in readiness and operative positions so that when bending support 1 is moved into its operative position (FIG. 1), upper or inside wall 11 of hollow-section strip 12 is deformed inward to introduce the bending process, without, in this case, compressing or upsetting the side walls of hollow-section strip 12, which are the walls of hollow-section strip 12 that adjoin surfaces 23, 24 of clamping and guiding jaws 20, 21. During the actual bending process, projections 16 support the side walls of hollow-section strip 12 from inside, so that the latter cannot yield inward.

Support 4 of the bending support is, as shown in FIG. 8, fastened to a holder 40. For this purpose, a groove 41, in which support 4 is inserted and is fastened with the aid of, for example, a screw, is recessed in holder 40. Holder 40 is guided to move via two guide rods 43 that are connected with it in a block 42 under the action of a double-action pressure-medium cylinder 44. Block 42 is fastened via two connecting plates 45 and 46 to a shaft 47 that is mounted to pivot, in bearing blocks 48 that are integral with the machine frame, around an axis that is perpendicular to the bending plane. On one plate 45 or 46, for example on plate 45, there engages a pressure medium cylinder or one of the other configurations of two or three pressure medium cylinders that are described below, to be able to move block 42 and thus holder 40 and finally, via support 4, bending support 1 from waiting position into readiness position and into operative position and back again.

Pressure medium cylinder 44, which is provided to adjust holder 40, is attached to a plate 47 that projects from plate 46, as is also shown in FIG. 8.

It should also be pointed out that for the sake of clarity, clamping or guiding jaw 20 that is integral with the machine frame is not depicted in FIG. 8.

A stop 49 for pressure spring 9 that engages on plate 8 and that loads bending support part 3 via plate 8 and guide pins 6, is also provided on holder 40.

Thanks to the design that is shown in FIG. 8, bending support 1 can be moved via its support 4 and holder 40 into the bending plane from waiting position into readiness position and into operative position. In addition, bending support 1, after it has been lifted out of the area between two clamping and guiding jaws 20, 21, can be retracted crosswise to the bending plane, e.g., behind the supporting wall not to impede the retraction of finished spacer frames for insulating glass panes.

Bending support 1 with its two bending support parts 2, 3 is pivoted from waiting position, in which it is located at a greater distance from clamping and guiding jaws 20, 21, into readiness position, in which tips 10 of bending support parts 2, 3 engage between the two clamping and guiding jaws 20, 21. Previously, movable clamping and guiding jaw 21 was moved so far away from clamping and guiding jaw 22 that is integral with the machine frame that between clamping and guiding jaws 20, 21, there is a distance that is greater than that of the maximum distance of outside surfaces 13, 14 of bending support parts 2, 3. By shifting movable clamping and guiding jaw 21 relative to clamping and guiding jaw 20 that is integral with the machine frame, the effective width of bending support 1 is adjusted automatically and in an infinitely variable manner.

To shift movable clamping and guiding jaw 21 and to adjust the effective width of divided bending support 1 to the width of hollow-section strip 12 that is to be bent or curved, movable clamping and guiding jaw 21 optionally can be moved by a pneumatic cylinder via a lever, whereby clamping and guiding jaw 21 is transported simply to the stop on hollow-section strip 12, without requiring a separate device for detecting the width of hollow-section strip 12, to produce a certain travel path for movable clamping and guiding jaw 21.

FIGS. 1, 6 and 8 show that a hooklike projection 30, which, when bending support 1 is moved into operative position, engages in a recess 31 on the top side of movable clamping and guiding jaw 21 (FIGS. 1 and 8), is placed on outside 14 of movable bending support part 3, so that movable bending support part 3 is locked with movable clamping and guiding jaw 21. This prevents movable bending support part 3 from shifting against the action of pressure spring 9 when a bending process is executed. This is especially important if a hollow-section strip 12 is to be curved, i.e., if it is conveyed under bending support 1, in its operative position, against an oblique inclined impact surface that is on the bending lever.

Because divided bending support 1 is made separate from clamping and guiding jaws 20, 21, it can also be moved relative to clamping and guiding jaws 20, 21 (shifting from operative position into readiness position and back again), if clamping and guiding jaws 20, 21 adjoin the side walls of hollow-section strip 12 that is to be bent. It is thus possible to perform the intermediate transport of hollow-section strip 12 between the individual bending processes without opening clamping and guiding jaws 20, 21. Divided bending support 1 can be moved without changing the position of clamping and guiding jaws 20, 21 but also completely from its position between the latter, i.e., from its position that is recessed between clamping and guiding jaws 20, 21, out and into waiting position and be retracted, for example, behind the supporting wall, if a corner is to be bent, in which the legs of hollow-section strip 12 that run to the corner form an acute angle with one another.

To move bending support 1 and its support 4 with its holder 40 from waiting position into readiness position and into operative position, holder 40, as FIG. 8 shows by way of example, Is carried by a machine part (block 42) that is mounted to pivot in the machine frame around an axis that is perpendicular to the bending plane, a machine part for whose actuation, for example, a pressure medium cylinder is provided. In this case, a configuration of two coaxially arranged pressure medium cylinders can be provided, from which a pressure medium cylinder executes the lift of support 4 and thus bending block 1 from waiting position into readiness position, and the second pressure medium cylinder with a corresponding stroke limit executes the movement from readiness position into operative position and back again into readiness position.

Holder 40 for support 4 of bending support 1 can be shifted by means of pressure medium cylinder 44 via guideways 43 perpendicular (arrow 33) to the bending plane.

To pivot bending block 1 around the axis that is defined by bearing blocks 48, system 50 shown in FIG. 9 that consists of three coaxially arranged pressure medium cylinders 51, 52 and 53 can also be provided instead of the described configuration with two pressure medium cylinders and a stop. For the pivoting of the subassembly that consists of bending support 1, holder 4 and block 42 as well as pressure medium cylinder 44, which is mounted on shaft 47, a system 50 that consists of three pressure medium cylinders 51, 52 and 53 that are connected behind one another and have different stroke lengths is provided in the embodiment according to FIG. 9.

To move bending block 1 from a retracted position into waiting position, pressure medium cylinder 51 with the longest stroke is actuated. By actuating (extending) pressure medium cylinder 53 with a stroke that is less than that of cylinder 51 but greater than that of cylinder 52, bending support 1 is moved into readiness position. To move bending support 1 from readiness position into operative position, third pressure medium cylinder 52 with the smallest stroke is actuated so that now all three pressure medium cylinders 51, 52, 53 of system 50 are in their extended position. If bending support 1 is to be moved back and forth only between operative position and readiness position (in this case, tips 10 of both bending support parts 2 and 3 remain in the area of clamping jaws 20 and 21), it is sufficient to actuate pressure medium cylinder 52.

It should also be pointed out that divided bending support 1, in its operative position including its support 4, in the direction of feed of hollow-section strip 12, can be oriented at an angle of approximately 45°.

In summary, the invention can be represented, for example, as follows:

In a device for bending hollow-section strips 12 with clamping and guiding jaws 20, 21 for hollow-section strip 12 that is to be bent, a bending support 1 is provided, which consists of two bending support parts 2, 3 that engage between clamping and guiding jaws 20, 21. Bending support parts 2, 3 are components that are independent of clamping and guiding jaws 20, 21 and can be shifted in the bending plane relative to clamping and guiding jaws 20, 21. One bending support part 2 is mounted on a support 4, and other bending support part 3 can be shifted relative to bending support part 2 that is mounted on support 4 in a direction (arrow 5) that is perpendicular to the bending plane, whereby movable bending support part 3 is under the action of a spring 9, which stresses it by a bending support part that is mounted on support 4. Thus, bending support 1 that engages between clamping and guiding jaws 20, 21 is automatically adjusted to an effective width that corresponds to the width of hollow-section strip 12, if movable jaw 21 approaches stationary jaw 20, to clamp hollow-section strip 12 (production of corners) and to guide the same (production of curved sections). For intermediate transport of hollow-section strip 12, clamping and guiding jaws 20, 21 do not need to be raised from the side walls of hollow-section strip 12. It is sufficient to shift bending support 1 into its readiness position shown.

What is claimed is:

1. In a device for bending a hollow-section strip (12) having clamping and guiding jaws (20, 21) for engaging sides of the strip and which are parallel to a bending plane of the device, at least one of the laws (21) being movable relative to the other of the jaws (20), a bending support (1) which has two bending support parts (2, 3) for depressing a surface of the strip perpendicular to the bending plane, and a bending lever that can pivot for bending the strip; the improvement wherein said bending support parts (2, 3) are independent of said clamping and guiding jaws (20, 21) and are movable in the bending plane relative to said clamping and guiding jaws (20, 21).

2. Device according to claim 1, wherein the distance of said two bending support parts (2, 3) from one another can be changed.

3. Device according to claim 1, wherein one said bending support part (2) is mounted on a support (4) and wherein the other said bending support part (3) can be shifted relative to said bending support part (2) that is mounted on said support (4) in a direction (arrow 5) that is perpendicular to said bending plane.

4. Device according to claim 3, wherein said movable bending support part (3) is fastened to at least two guide rods (6), which are guided in guideways (7) in said support (4) for said bending support (1).

5. Device according to claim 4, wherein on the side of said support (4) that is opposite to said bending support (1), a pressure spring (9) engages said guide rods (6) for said movable bending support part (3).

6. Device according to claim 5, wherein said pressure spring (9) engages a plate (8) that is connected with said guide rods (6) and on a component (40, 49) that is at least indirectly connected to said support (4).

7. Device according to claim 1, wherein surfaces (13, 14) of said two bending support parts (2, 3) that face away from one another are turned toward surfaces (23, 24) of said clamping and guiding jaws (20, 21) that face one another, and adjoin the surfaces (23, 24) of said clamping and guiding jaws (20, 21) when the surfaces (23, 24) of said laws (20, 21) adjoin the side surfaces of said hollow-section strip (12).

8. Device according to claim 1, wherein said bending support (1) can be shifted from a waiting position, in which it does not engage between said clamping and guiding jaws (20, 21), into a readiness position in which it engages between said clamping and guiding jaws (20, 21) (FIG. 1) and from the latter into an operative position, in which free ends (10, 16) of said bending support parts (2, 3) are at a distance from the support that is provided between said clamping and guiding jaws (20, 21) for the hollow-section strip (12) that is to be bent, a distance that is less than the height of said hollow-section strip (12) as measured in the bending plane.

9. Device according to claim 1, wherein free ends (10) of said bending support parts (2, 3), viewed crosswise to said bending plane, are wedge-shaped.

10. Device according to claim 1, wherein beadlike projections (16) are provided on free ends (10) of said bending support parts (2, 3).

11. Device according to claim 10, wherein at least said beadlike projections (16) are offset relative to side surfaces (13, 14) of said bending support parts (2, 3) that face surfaces (23, 24), facing one another, of said clamping and guiding jaws (20, 21) so that said beadlike projections (16) are at a distance from said surfaces (23, 24), facing one another, of said clamping and guiding jaws (20, 21).

12. Device according to claim 1, wherein to shift said bending support (1) into a waiting position, into a readiness position and into an operative position, an assembly (50) of three pressure medium cylinders (51, 52, 53) is provided, which engages at least indirectly said bending support (1).

13. Device according to claim 12, wherein said assembly (50) of pressure medium cylinders engages a block (42), which carries a holder (40) for said support (4), via a projection (45).

14. Device according to claim 12, wherein said pressure medium cylinders (51, 52 and 53) of said assembly (50) have different stroke lengths.

15. Device according to claim 12, wherein the said pressure medium cylinder (51) of said assembly (50) with the longest stroke is adapted to move said bending support (1) into a waiting position.

16. Device according to claim 12, wherein a pressure medium cylinder (53) with a stroke that is less than that of one (51) and greater than that of another said pressure medium cylinder (52) is provided to move said bending support (1) from a waiting position into a readiness position.

17. Device according to claim 12, wherein a said pressure medium cylinder (52), which moves said bending support (1) between an operative position and a readiness position, is said pressure medium cylinder (52) with the shortest stroke.

18. A device for bending a hollow-section strip comprising:
- two jaws for engaging sides of the strip, at least one of said jaws being movable relative to the other of said jaws;
- a bending support which has two bending support parts which are independent of said jaws and which are movable in a bending plane of the device relative to said jaws into an operative position for depressing a surface of the strip, one of said two bending support parts being movable with the movable one of said two jaws when said parts are in the operative position for preventing movement of said movable one of said bending support parts crosswise to the bending plane; and
- a bending lever that is pivotable for bending the strip.

19. Device according to claim 18, wherein said movable bending support part (3) has a hook-shaped projection (30), receivable in a locking recess (31) in the movable one of said laws (21), whereby said hook-shaped projection (30) engages in said locking recess (31) when said bending support (1) has been shifted into the operative position.

20. A device for bending a hollow-section strip comprising:
- two clamping and guiding jaws for engaging sides of the strip, at least one of said jaws being movable relative to the other of said jaws;
- a bending support which has two bending support parts which are independent of said jaws and which are movable in a bending plane of the device relative to said jaws for depressing a surface of the strip, one of said two bending support parts being movable relative to the other of said two bending support parts which is affixed to a support and urged away therefrom by spring means mounted on said support; and
- a bending lever that is pivotable for bending the strip.

* * * * *